United States Patent
Donato

[11] 3,923,037
[45] Dec. 2, 1975

[54] COOKER

[75] Inventor: Joseph Donato, North Balwyn, Australia

[73] Assignee: Modern Maid (Vic.) Pty. Ltd., Footscray, Australia

[22] Filed: Oct. 1, 1974

[21] Appl. No.: 511,005

[30] Foreign Application Priority Data
Oct. 2, 1973  Australia.......................... 5066/73

[52] U.S. Cl. ........ 126/39 C; 126/39 R; 126/39 BA; 99/339; 219/394; 219/478
[51] Int. Cl.² ............................................ F24C 3/00
[58] Field of Search.. 126/1 C, 39 BA, 39 C, 275 E, 126/19 R, 273, 218, 39 R, 1 R, 1 F; 219/393, 394, 396, 397, 478, 444; 99/339, 340

[56] References Cited
UNITED STATES PATENTS

| | | |
|---|---|---|
| 1,748,742 | 2/1930 | Thomson et al. ................. 126/39 C |
| 1,980,307 | 11/1934 | Wilkinson et al. ................. 126/39 C |
| 2,025,896 | 12/1935 | Reedy .............................. 126/39 C |
| 2,478,254 | 8/1949 | Doner ............................. 126/1 R X |
| 2,480,045 | 8/1949 | Reeves ............................ 126/19 R |
| 3,008,406 | 11/1961 | Reeves et al. ...................... 99/446 |
| D108,114 | 1/1938 | Burrow ......................... 126/39 R X |
| D117,559 | 11/1939 | Drury............................ 126/39 R X |

Primary Examiner—William F. O'Dea
Assistant Examiner—Harold Joyce
Attorney, Agent, or Firm—Silverman & Cass, Ltd.

[57] ABSTRACT

A cooker including a cooking range with at least one heating device arranged for heating of the underside of a cooking receptacle and, positioned adjacent said range, an upwardly open warming compartment provided with heating means for heating articles placed within the interior thereof.

7 Claims, 4 Drawing Figures

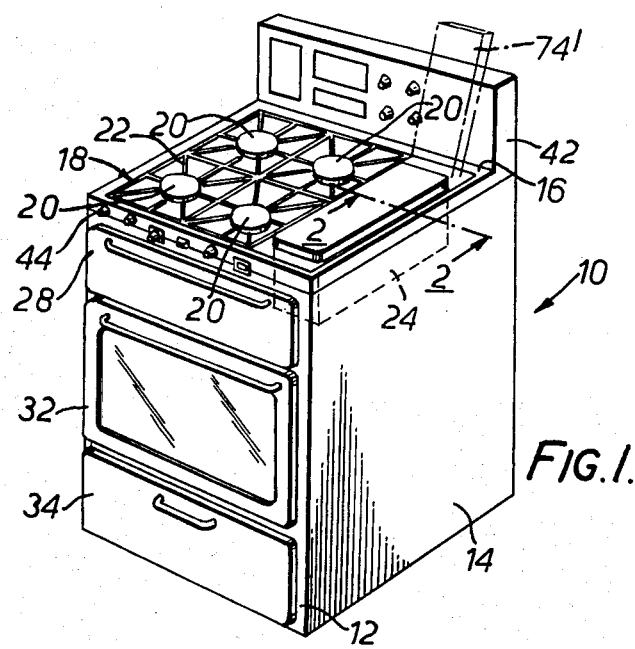
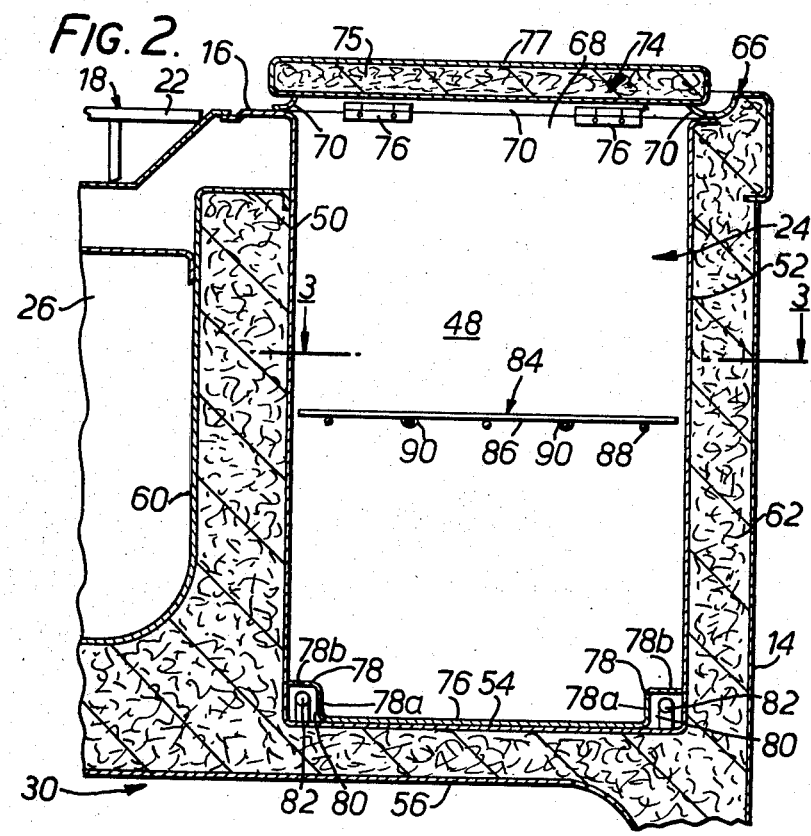

3,923,037

COOKER

BACKGROUND OF THE INVENTION i. Field of the Invention

This invention relates to cookers.

ii. Prior Art

Domestic cooking usually calls for use of a cooking range for heating of pots and saucepans, an oven, used for baking, and a griller for grilling or toasting. Aside from these functions, there is some need for low temperature heating of foods and other things such as plates. The normal oven is not entirely, of itself, satisfactory for this purpose firstly because it may not prove possible to properly regulate the temperature to the relatively low heat required, and secondly because, often, the oven will, in cooking, need to be used itself for other purposes. The griller and range are not suited at all to use for this purpose. Accordingly, it is known to provide a separate low temperature heating oven. In cookers including the range, griller and oven as a single unit the separate low temperature oven may, for example, be mounted above the cooking range whilst the griller and main oven are below the range. Provision of an oven of this kind is a relatively costly expedient.

An object of the invention is to provide a cooker having means for warming food, plates and the like and which allows a relatively inexpensive construction to be utilised.

BRIEF DESCRIPTION OF THE INVENTION

According to the invention there is provided a cooker including a cooking range with at least one heating device arranged for heating of the underside of a cooking receptacle and, positioned adjacent said range, an upwardly open warming compartment provided with heating means for heating articles placed within the interior thereof. The compartment may be provided with a hinged or removable cover which, when positioned to close off the receptacle, provides an upper surface adjacent said range and upon which cooking receptacles such as saucepans may be stood. Preferably, the warming compartment is arranged to one side of said range. The cooker may be of a kind including a grilling compartment which is open to the front of the cooker and the said warming compartment may be alongside the grilling compartment. The cooker may also include an oven compartment positioned below the grilling compartment. Heating of the warming compartment may be by means of an electric element positioned in the warming compartment. In a particularly preferred form of the invention, the warming compartment is provided with rack means for supporting food or plates. The rack means may support the plates in upright edge-on disposition for warming.

BRIEF DESCRIPTION OF THE SEVERAL VIEWS OF THE ACCOMPANYING DRAWINGS

The invention is further described with reference to the accompanying drawing in which:

FIG. 1 is a perspective view of a cooker constructed in accordance with the invention;

FIG. 2 is a fragmentary cross-section on the line 2—2 in FIG. 1;

DETAILED DESCRIPTION

Figure 3:
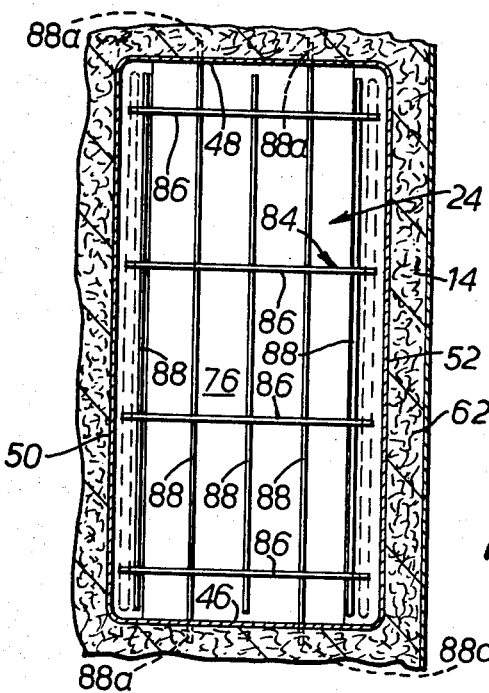
FIG. 3 is a fragmentary cross-section on the line 3—3 in FIG. 2.

Referring firstly to FIGS. 1 to 3, the cooker 10 shown is of upright generally box-like configuration having a front wall 12 and a pair of side walls 14 (only one of which is visible in the drawing) and a rear wall (not visible in the drawings). The cooker has a top surface 16 of generally rectangular form and includes therein, and to one side of the cooker, a cooking range 18 comprising four gas burners 20 together with structure 22 for supporting saucepans over the burners. A grilling compartment 26 is disposed below range 18, this being open to the front of the cooker through wall 12. The front opening of compartment 26 is closable by a hinged panel 28. The grilling compartment has an interior burner (not shown) for grilling of foods placed in the compartment. An oven compartment 30 is provided below compartment 26 this also being open to the front of the cooker through wall 12. The front opening of compartment 30 is closable by a hinged door 32. A storage compartment (not shown) is provided below the compartment 30. This is open to the front of the cooker through wall 12 and the front opening thereof is closable by a hinged panel 34. Controls 44 for burners 20 are provided along the upper margin of wall 12 and a control panel 42 for other cooker functions is provided at the rear of the cooker and extending upwardly from top surface 16.

A compartment 24 is provided adjacent range 18 and to the side of the cooker opposite the range. Compartment 24 is open at the top thereof to surface 16. It is of elongate rectangular configuration when viewed in plan, being defined by front and rear upright rectangular metal end panels 46, 48 upright rectangular side panels 50, 52 each extending between panels 46, 48 and a horizontal base panel 54 also of rectangular configuration. As best seen in FIGS. 2 and 3, side wall 14 is formed of sheet metal and side panel 52 is positioned inwardly of wall 14. Compartment 26 has a sheet metal side wall 60 and panel 50 of compartment 24 likewise extends adjacent to, but spaced from this. The base 54 is in spaced disposition above an upper sheet metal panel 56 of oven compartment 30 whilst end panels 46, 48 are spaced inwardly from the front and rear walls of the cooker so that a space is provided around the outer surfaces of the panels defining the compartment 24. This space is filled with insulating material 62.

Panels 46, 48, 50, 52 join to an upper wall structure 66, on which surface 16 is defined. Structure 66 has a rectangular opening 68 to compartment 24 which opening is bounded at four sides by small flanges 70 of the panels 46, 48, 50, 52. A lid 74 is provided for compartment 24. This is of elongate rectangular form hinged at its rear end, by hinges 76, to panel 48 at the upper edge thereof, thus to allow the lid to be swung from the position shown in solid lines in FIG. 1, at which position opening 68 is covered, to an upwardly and rearwardly extending position shown by phantom lines 74' in FIG. 1, at which access to the compartment via opening 68 can be achieved. Lid 74 is hollow, having insulating material 75 therein and bounded by a sheet metal outer wall 77.

A metal floor panel 76 in compartment 24 overlies base panel 54. This is of generally rectangular configuration when viewed in plan, extending from side to side and end to end of the compartment. Marginal side portions of panel 76 are bent so that panel 76 is of wide shallow channel-shaped configuration with upstanding flanges 78 to either side of a flat central portion 76a. Each flange 78 includes upstanding portions 78a which extend upwardly from portion 76a and outwardly extending horizontal portions 78b which extend outwardly from the upper edges of portions 78a. Portions 78b terminate in side edges which extend in close proximity to and along the length of panels 50, 52. The flanges 78 define, together with lower corner portions of compartment 24 defined at the intersections of the respective pairs of panels 50, 54 and 52, 54, spaces 80 at the base of the compartment and to either side thereof. Each houses an elongate electrical heating element 82.

A rigid open grid 84 (FIGS. 2 and 3) composed of intersecting elongate side to side elements 86 and elongate end to end elements 88 is removably positionable to extend from end to end of the compartment and from side to side thereof at a location midway between the top and bottom of the compartment. Panels 46, 48 have openings 90 (FIG. 2) which receive elongate extended end portions 88a (FIG. 3) of two of the elements 88 to support the grid. The grid can be removed by sliding it rearwardly or forwardly so that end portions 88a at either the front of the rear of compartment 24 are freed from their openings 90, and by then swinging the free end of the grid upwardly a sufficient distance to enable the other portions 88a to be freed from their openings 90 by withdrawal.

Figure 4:
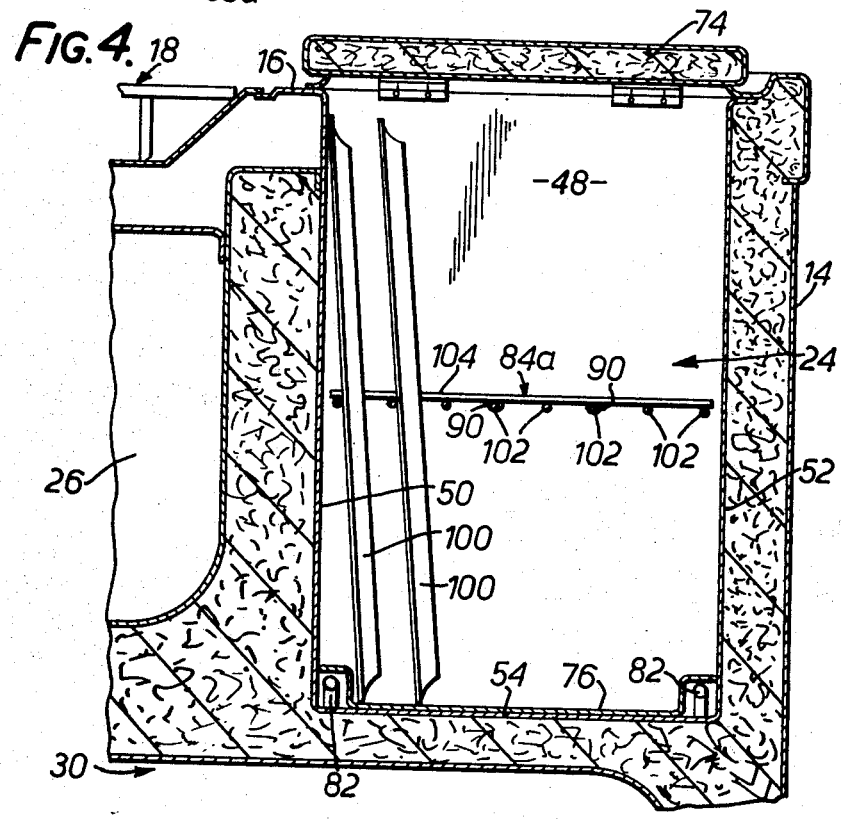
FIG. 4 is a cross-section, like FIG. 2, but showing a modified construction.

Range 18 and the grilling, oven and storage compartments are of conventional form and are used in the normal way. Compartment 24 is useful for storage of heated foods to be kept warm. The compartment is also dimensioned to enable plates to be stored therein for warming. Grid 84, which normally provides a shelf for placing of articles thereon may be removed to allow plates to be positioned resting on their side edges and on the floor of the compartment. In FIG. 4 a modified grid 84a is shown, this having a plurality of relatively closely spaced front to rear extending elongate elements 102 and only side to side elongate elements 104 at opposite ends thereof. This can be used as shown to facilitate storage of plates 100 to be warmed, the plates resting edge-on on the floor of the compartment and positioned between pairs of elements 102.

Heating of plates or other articles in the compartment 24 is achieved by application of electric current to electrical heating elements 82. A control to vary the temperature of heating in the compartment may be readily incorporated into the cooker control. Elements 82 are normally of low heat capacity but may be of greater capacity to allow cooking in compartment 24. The arrangement, in addition to warming plates and keeping warm food already cooked, may also be used for heating water to permit the use of the compartment as a bain-marie. Lid 74 can be closed to retain heat in the compartment whilst the upper surface of the lid can be used for resting pots and saucepans thereon when the lid is closed.

The described construction has been advanced merely by way of explanation and many modifications may be made thereto without departing from the spirit and scope of the invention as defined in the appended claims.

I claim:

1. A cooker comprising, an oven compartment extending substantially across the width thereof, side-by-side grilling and warming compartments above the oven compartment, the grilling and oven compartments opening to the front of the cooker and the warming compartment opening to the top thereof, a cooking range on the top of the cooker adjacent the said warming compartment and above said grilling compartment, the cooking range including at least one heating device arranged for heating of the under-side of a cooking receptacle placed thereon, said warming compartment including a flat topped cover movable to a closed position at which the warming compartment is substantially closed with the top of the cover providing a surface for standing of cooking receptacles thereon and to an open position providing access to the warming compartment, thermal insulation between the grilling compartment, warming compartment and oven compartment, an internal electric heating element in the warming compartment for warming of articles placed therein, said warming compartment extending to a depth below the top of the cooker which is greater than the depth of the grilling compartment.

2. A cooker as claimed in claim 1 including support means in said warming compartment for supporting plates in edge-on disposition on a floor of said warming compartment.

3. A cooker as claimed in claim 1 including a rigid open grid removably positioned in the warming compartment, the grid having intersecting elongate side to side elements and elongate end to end elements to extend substantially from end to end and side to side of the compartment, and means between the compartment and the grid to maintain the grid above the floor of the compartment.

4. A cooker as claimed in claim 3 in which said means include openings in a pair of oppositely facing walls of said compartment and extended opposite end portions of at least two of said elements, the end portions adapted for engagement in the openings.

5. A cooker comprising, an oven compartment extending substantially across the width thereof, side-by-side grilling and warming compartments above the oven compartment, the grilling and oven compartments opening to the front of the cooker and the warming compartment opening to the top thereof, a cooking range on the top of the cooker adjacent the said warming compartment and above the grilling compartment, the cooking range including at least one heating device arranged for heating of the under-side of a cooking receptacle placed thereon, said warming compartment including a flat topped cover movable to a closed position at which the warming compartment is substantially closed with the top of the cover providing a surface for standing of cooking receptacles thereon and to an open position providing access to the warming compartment, thermal insulation between the grilling compartment, warming compartment and oven compartment, an internal electric heating element in the warming compartment for warming of articles placed therein, said warming compartment extending to a depth below the top of the cooker sufficient to accommodate a dinner plate in edge on upright disposition when said top is in said closed position.

6. A cooker comprising, an oven compartment extending substantially across the width thereof, side-by-side grilling and warming compartments above the oven compartment, the grilling and oven compartments opening to the front of the cooker and the warming compartment opening to the top thereof, a cooking range on the top of the cooker adjacent the said warming compartment and above said grilling compartment, the cooking range including at least one heating device arranged for heating of the under-side of a cooking receptacle placed thereon, said range and warming compartment extending substantially from front to rear of the cooker, said warming compartment including a front to rearward elongated rectangular flat topped cover hinged about an edge thereof adjacent the rear of the cooker for swinging movement to a closed position at which the warming compartment is substantially closed with the top of the cover providing a surface for standing of cooking receptacles thereon and to an open position providing access to the warming compartment, floors of the warming compartment and grilling compartment being separated from a roof of the oven compartment by thermal insulation and sides of the warming compartment being separated from the front and rear walls of the cooker and from a side wall of the cooker and of the grilling compartment adjacent to the warming compartment by thermal insulation material, said cover also containing thermal insulation material, and the warming compartment having an internal electric heating element for warming of articles placed therein.

7. A cooker as claimed in claim 6 including support means in said warming compartment for supporting plates in edge-on disposition on a floor of said warming compartment.

* * * * *